United States Patent Office 3,526,666
Patented Sept. 1, 1970

3,526,666
SYNTHESIS OF 2-HYDROXY-4-ALKOXYBENZOPHENONES
Fernando J. Ponder, Broadview Heights, Ohio, assignor to Ferro Corporation, Cleveland, Ohio, a corporation of Ohio
No Drawing. Filed Jan. 12, 1968, Ser. No. 697,311
Int. Cl. C07c 49/82
U.S. Cl. 260—591    8 Claims

ABSTRACT OF THE DISCLOSURE

The present invention relates to the synthesis of 2-hydroxy-4-alkoxybenzophenones by a condensation reaction between 2,4-dihydroxybenzophenone and an alkyl chloride, the reaction being carried out in a suitable solvent and in the presence of a catalyst.

BACKGROUND OF INVENTION

It has long been known that certain 2-hydroxy-4-alkoxy-4-alkoxybenzophenones, such as 2-hydroxy-4-octyloxybenzophenone, and 2-hydroxy-4-dodecyloxybenzophenone, impart outstanding ultraviolet light stability to various types of polymer compositions when incorporated therein. The high cost of such 2-hydroxy-4-alkoxybenzophenones has, however, limited their use as stabilizers.

In the past there have been two general lines along which one could proceed in the synthesis of 2-hydroxy-4-alkoxybenzophenones. In the first of these methods, 2,4-dihydroxybenzophenone was synthesized and purified, and then alkylated using an alkyl bromide as illustrated by Equations I and II. Equation I illustrates the Friedel-Crafts condensation of benzoyl chloride with resorcinol, and Equation II illustrates the alkylation reaction of the 2,4-dihydroxybenzophenone with the alkyl bromide. As referred to herein unless otherwise specifically noted, alkylation and alkylation reaction shall be understood to mean bonding of the alkyl group to an oxygen atom on a ring carbon of the benzophenone radical and not directly to a ring carbon.

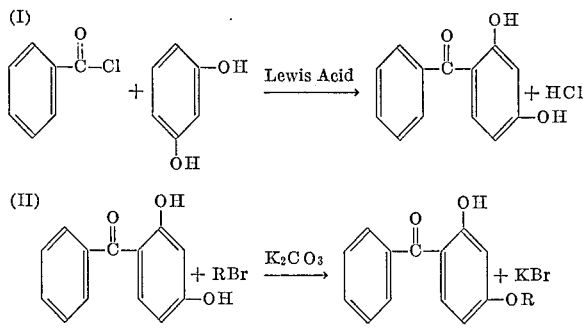

In actual experiments in which these synthesis procedures were followed (as a part of the evaluation of the method of the present invention) each of the foregoing reactions gave a yield of about 60%. The final yield of 2-hydroxy-4-alkoxybenzophenone was, therefore, about 36% or less, based on the benzoyl chloride.

The O-alkylation of the 2,4-dihydroxybenzophenone with an alkyl bromide proceeds very rapidly, and a catalyst is not required for the alkylation reaction when the alkyl bromide is employed. Where the alkyl bromide is employed, it is accepted practice to conduct the reaction in the presence of a neutralizing base such as an alkali metal carbonate. The alkali metal carbonate reacts with the hydrobromic acid formed by the alkylation reaction, to form the alkali metal bromide. The bromine, in the form of the alkali metal bromide is far less valuable than it was in the form of the alkyl bromide. This difference is reflected as a significant element in the cost of the process.

Since the alkyl bromide is expensive, it is desirable to be able to use the much cheaper alkyl chloride. However, in experiments heretofore conducted, attempts to substitute the theoretically equivalent, but slightly less reactive, alkyl chloride have met with little success, even when a variety of different catalysts were employed. In experiments to be described in more detail hereinafter, attempting to alkylate 2,4-dihydroxybenzophenone with an alkyl chloride, it was found that in the absence of a catalyst no discernible evidence of any reaction at all was observed.

The preceding method of synthesizing 2-hydroxy-4-alkoxybenzophenone has proven to be far too expensive for more than limited commercial exploitation. Not only was the O-alkylation step expensive, but the Friedel-Crafts condensation of benzoyl chloride with resorcinol, in the presence of a Lewis acid, to form the 2,4-dihydroxybenzophenone was also costly, principally because of the price of the catalyst and the more elaborate synthesis procedures.

The other known method of synthesizing 2-hydroxy-4-alkoxybenzophenones, is by alkylating resorcinol to produce a 1,3-dialkoxy benzene and then reacting the 1,3-dialkoxy benzene with benzoyl chloride in the presence of aluminum chloride which acts as both a condensing and dealkylating agent. In general, the foregoing condensation-dealkylation procedure is usually effective only when the alkyl radical is a methyl radical and even then only when the methoxy group is adjacent to the carbonyl group. It also has a number of other shortcomings, including the cost of adding an alkyl group to the resorcinol which must be removed at additional cost in a subsequent reaction.

U.S. Pat. 2,861,105 discloses and claims a mixture of catalyst which can be employed in place of the aluminum chloride, in the previously noted condensation-dealkylation procedure. The specification of that patent specifically notes that when the 2-hydroxy-4-alkoxybenzophenones are to be used as ultraviolet absorbers, in colorless organic film-forming plastics, resins, gums and the like, it is absolutely essential to employ substantially pure 2-hydroxy-4-alkoxybenzophenone.

Thus, U.S. Pat. 2,861,105 teaches that when employing the 2-hydroxy-4-alkoxybenzophenone in clear plastics, it is essential that the benzophenone be substantially pure. Yet 2,4-dihydroxybenzophenone, from which the alkoxy derivative is made, is difficult to purify. It has previously been noted that despite low produce yield (typically about 60%), the accepted method of synthesizing 2,4-dihydroxybenzophenone is by the Friedel-Crafts condensation of benzoyl chloride and resorcinol. The principal advantage of that synthesis is that the product which is obtained is in a substantially pure form, free from highly discolored impurities. There are, of course, other methods of synthesizing 2,4-dihydroxybenzophenones, probably the oldest of which is disclosed in Beilstein (8,312) which describes boiling benzotrichloride (α,α,α-trichlorotoluene) with aqueous resorcinol to produce, on hydrolysis, 2,4-dihydroxybenzophenone, according to Equation III.

(III)

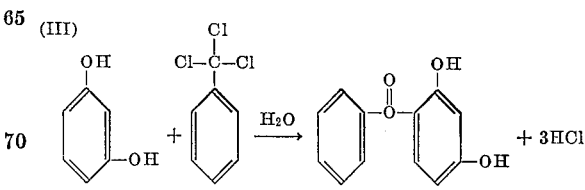

When resorcinol is treated with α,α,α-trichlorotoluene, however, the exothermic reaction may become unmanageable, with the consequent risk of explosion. The synthesis of 2,4-dihydroxybenzophenone, according to the method disclosed in Beilstein, is also considered undesirable because a highly colored crude product was obtained. In some instances it was impossible to purify the product, and at best it was extremely difficult, time consuming, and expensive to remove highly colored impurities from the product, e.g. usually by a long series of recrystallizations. The yield of substantially pure, completely decolorized 2,4-dihydroxybenzophenone was extremely small. The overall result of this need for extensive purification was a greatly increased product cost because of the labor required to effect the added purification steps, and a still further increase in product cost because of the very poor yields of pure material, e.g. each added recrystallization or purification step reduces the final yield.

Both the patent and journal literature clearly evidence a high degree of interest in attempts to discover better or cheaper methods of synthesizing 2-hydroxy-4-alkoxybenzophenones, and/or less expensive materials which can be employed with 2-hydroxy-4-alkoxybenzophenones to maintain a particular level of stabilization at a savings in cost. Insofar as such literature deals with synthesis techniques, most of the more recent articles deal with new techniques that produce at best only a slight improvement in yield and/or purity, though even a slight improvement has heretofore been considered highly significant in view of the extensive work which has been done in this area.

Other benzophenone research has been conducted in which various unsaturated aliphatic ether groups, and the like, have been substituted for the more commonly employed alkoxy radical in the 4-position. For example, U.S. Pat. 3,202,716 discloses and claims certain ethylenically unsaturated derivatives of 2,4-dihydroxybenzophenone prepared by an addition reaction of 2,4-dihydroxybenzophenone with a compound containing an epoxy group in the molecule. The reaction was conducted in the presence of a quaternary ammonium catalyst, proceeding according to Equation IV.

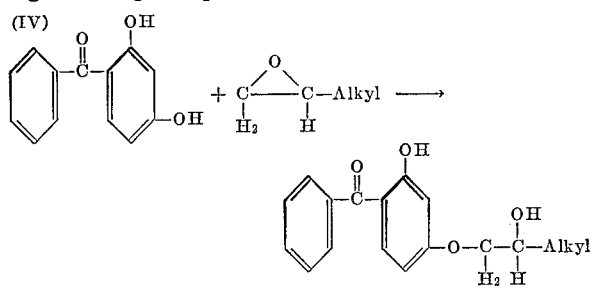

Such a reaction is, of course, entirely different from the condensation reaction involved in the alkylation procedure of the present invention, particularly insofar as the former does not involve the rupture of a carbon-chlorine bond.

SUMMARY OF INVENTION

I have now discovered that I can produce 2-hydroxy-4-alkoxybenzophenones in improved yields and at great savings in cost by reacting 2,4-dihydroxybenzophenone with analkyl chloride, in the presence of an iodide catalyst. I have also discovered that I can react α,α,α-trichlorotoluene with resorcinol to produce a very high yield of crude, highly colored (barely translucent dark orange) reaction product, which is mainly composed of crude 2,4-dihydroxybenzophenones, and that when this substantially unpurified highly colored crude product is treated with an alkyl chloride, in the presence of an iodide catalyst, I obtain an excellent yield of 2-hydroxy-4-alkoxybenzophenone which can be readily purified and in many applications can actually be used without purification. As compared with the previously known method of synthesizing the 2-hydroxy-4-alkoxybenzophenone, by the Friedel-Crafts condensation or resorcinol with benzoyl chloride, followed by alkylation, I have obtained as much as a 50% increase in yield as compared with the best yields heretofore possible, and I can produce such benzophenones at a substantial savings in cost, time and trouble.

In general the novel method of the present invention comprises the steps of:

(a) reacting 2,4-dihydroxybenzophenone with an alkyl chloride in the presence of an hydrocarbon quaternary ammonium iodide catalyst,
(b) collecting the 2-hydroxy-4-alkoxybenzophenone,
(c) to the extent required by the end use for which the product is intended, purifying the 2-hydroxy-4-alkoxybenzophenone.

My invention also contemplates the additional preliminary steps of:

(d) reacting α,α,α-trichlorotoluene with a slight excess of a dihydroxybenzene in the presence of water to form a crude dihydroxybenzophenone,
(e) collecting said crude dihydroxybenzophenone and using same without further purification in step (a) above.

In the preparation of organic chemicals by multi-step syntheses, it is ordinarily considered good practice to remove impurities after each reaction step, to avoid the accumulation of impurities to the point where final purification is achievable only at a great reduction in the overall yield. Although the 2,4-dihydroxybenzophenone produced by the condensation o resorcinol with α,α,α-trichlorotoluene is dark colored and difficult to purify, it was surprisingly found that this impure intermediate product, when O-alkylated according to the method of the present invention, yields a product from which impurities are relatively easily removed. It was also found that the overall yields of the process exceed those obtained by procedures such as the Friedel-Crafts condensation of benzoyl chloride which produced a far better colored intermediate. This superiority of yield and simplicity of operation is combined with the advantages of relatively low cost raw materials to achieve an unexpectedly attractive process from the economic point of view.

Thus the results of the present invention are unexpected insofar as any substantial yield of pure product is produced, from the highly colored, unpurified, crude dihydroxybenzophenone starting material, particularly since the crude dihydroxybenzophenone was very difficult to purify or decolorize. The results are further unexpected when one considers the widely accepted teachings of the art that even minute traces of impurity are highly objectionable, and often fatal, to the utility of the 2-hydroxy-4-alkoxybenzophenone product.

These results are even more highly unexpected insofar as it is possible to attain a yield 50% higher than the highest yields obtained using the dihydroxy benzophenone produced by the Friedel-Crafts synthesis and insofar as it is possible to produce excellent yields of highly pure 2-hydroxy-4-alkoxy-benzophenone, employing the far less expensive alkyl chloride in place of the prohibitively expensive alkyl bromides which were heretofore considered absolutely essential.

THE PREFERRED EMBODIMENT

The preferred embodiment of my invention relates to the synthesis of 2-hydroxy-4-alkoxybenzophenones and more particularly to the synthesis of 2-hydroxy-4-octyloxybenzophenones and 2-hydroxy-4-dodecyloxybenzophenone. The following will serve by way of illustration and not by way of limitation to illustrate the novel synthesis of the present invention.

EXAMPLE I 352 grams of α,α,α-trichlorotoluene were added, with constant stiring, over a period of about one hour, to a solution of 220 grams of resorcinol in about 900 millimeters of water, the resorcinol solution having been heated to a temperature of 40°–50° C. Formation of the dihydroxybenzophenone was evidenced by an exothermic reaction, and a sharp drop in pH (due to the HCl formed as a reaction product). The reaction mixture was then cooled to room temperature after which a dark reddish-orange colored precipitate was observed. The precipitate was filtered to yield an opaque, highly orange colored product which was washed with warm water until the wash water was neutral to litmus. The precipitate was then dried to a constant weight to yield 355 grams of 95.4% based on the $\alpha,\alpha,\alpha$-trichlorotoluene of an opaque highly orange colored powder having a melting point of 139°–140° C.

EXAMPLE II 107 grams of the dry, crude 2,4-dihydroxybenzophenone produced according to Example I were dissolved in 485 grams of methyl isoamyl ketone in a reactor (equipped for heating, cooling, stripping, refluxing and agitation) and 104 grams of anhydrous $K_2CO_3$ was added slowly with constant agitation, along with 113 grams of n-octyl chloride and 1 gram of tetrabutyl ammonium iodide. The quaternary ammonium iodide was the catalyst. The reaction mixture was then refluxed for 16 hours at 144° C., cooled to room temperature, and filtered to remove KCl and excess $K_2CO_3$, after which all the methyl isoamyl ketone, and any unreacted n-octyl chloride, was stripped off under vacuum. The batch was then cooled to 50°–55° C., about 100 mls. of anhydrous methanol were added with agitation, and cooling was continued until the product stopped crystallizing out. The crude product was filtered, purified by recrystallization from a mixture of acetone and methanol (with 10 grams of activated clay as a decolorizing agent). The purified product was collected and dried to produce a 59% yield based on the 2,4-dihydroxybenzophenone, of a very pale yellow crystalline material having a melting point of 40°–43° C. which was identified as 2-hydroxy-4-n-octyloxybenzophenone. This yield was 56.3% of the overall theoretical yield, based on the $\alpha,\alpha,\alpha$-trichlorotoluene employed in the synthesis of the 2,4-dihydroxybenzophenone.

EXAMPLE III

The procedure of Example II was repeated using triethyl-butyl-ammonium iodide as the catalyst. A 53% yield of 2-hydroxy-4-octyloxybenzophenone was obtained. This was an overall yield of 50.6% based on the $\alpha,\alpha,\alpha$-trichlorotoluene employed in the synthesis of the 2,4-dihydroxybenzophenone.

EXAMPLE IV

The highly purified 2,4-dihydroxybenzophenone of Example V was alkylated with octyl chloride in a manner of 2-hydroxy-4-octyloxybenzophenone was obtained. This was an overall yield of 49.6% based on the $\alpha,\alpha,\alpha$-trichlorotoluene employed in the synthesis of the 2,4-dihydroxybenzophenone.

EXAMPLE V 2,4-dihydroxybenzophenone was prepared by the Friedel-Crafts condensation reaction, by reacting equimolar quantities of resorcinol, benzoyl chloride, and aluminum chloride at 40° C., for a period of 8½ hours. A 57% yield of a highly pure, white powdered, material which was identified as 2,4-dihydroxybenzophenone was obtained.

EXAMPLE VI

The highly purified 2,4-dihydroxybenzophenone of Examyle V was alkylated with octyl chloride in a manner similar to that set forth in Example II, using tetrabutyl ammonium iodide as the catalyst, and methyl isoamyl ketone as the solvent. The reaction was carried out at 145° C. to produce a 57% yield of 2-hydroxy-4-octyloxybenzophenone. This was an overall yield of 32.5% based on the benzoyl chloride employed in the synthesis of the 2,4-dihydroxybenzophenone.

EXAMPLE VII

The procedure of Example VI was repeated substituting methyl isobutyl ketone for the methyl isoamyl ketone of Example VI and carrying out the reaction at 120° C. instead of 145° C. (because of the low boiling point of the methyl isobutyl ketone). The reaction was allowed to proceed for 12 hours at which time only a 6% yield of 2-hydroxy-4-octyloxybenzophenone was obtained. This procedure was then repeated with the reaction being allowed to proceed for 48 hours after which time the product was separated and a 30% yield of 2-hydroxy-4-octyloxybenzophenone was obtained. This was an overall yield of 17.1%, based on the benzoyl chloride employed in the synthesis of the 2,4-dihydroxybenzophenone.

EXAMPLE VIII

The procedure of Example VI was repeated substituting potassium iodide for the tetrabutyl iodide as the catalyst. The reaction was carried out at 145° C., and a 32% yield of 2-hydroxy-4-octyloxybenzophenone was obtained. This was an overall yield of 18.2%, based on the benzoyl chloride employed in the synthesis of the 2,4-dihydroxybenzophenone.

EXAMPLE IX

The procedure of Example II was repeated substituting dodecyl chloride for the octyl chloride of Example II. A 30% yield of 2-hydroxy-4-dodecyloxy benzophenone was obtained.

From the foregoing examples it will now be seen that the overall yield of 2-hydroxy-4-octyloxybenzophenone was 56.3% (based on the $\alpha,\alpha,\alpha$-trichlorotoluene, while the overoll yield of 2-hydroxy-4-octyloxy benzophenone would have been about 34.2% using pure 2,4-dihydroxybenzophenone (prepared by the Friedel-Crafts condensation reaction) and octyl bromide. This represents an increase of 64.5% when the overall synthesis procedure of the present invention is employed.

In further experiments a number of other quaternary ammonium iodide catalysts were tried, such as benzyltrimethylammonium iodide, and all were found to be effective in catalyzing the alkylation reaction. Also, other iodide compounds were also tried and found to be effective catalysts, though in general not as effective as the preferred clss of catalysts, quaternary ammonium iodide compounds. On the other hand, corresponding chloride compounds were found to be completely ineffective as catalysts.

It will now be obvious that the present invention provides an effective and efficient and much less expensive method of synthesizing 2 - hydroxy-4-alkoxy-benzophenones using an iodide catalyst and an alkyl chloride to effect alkylation of the 2,4-dihydroxybenzophenone. It will also be obvious that a substantial increase in yield, and an even greater than proportional saving in cost can be obtained where the 2,4-dihydroxybenzophenone employed for the alkylation reaction is the crude, substantially unpurified 2,4 - dihydroxybenzophenone prepared by hydrolyzing the reaction product of $\alpha,\alpha,\alpha$-trichlorotoluene with resorcinol. It will, therefore, be understood that since many changes, alternations, and substitutions, can be made in the foregoing procedure and materials, without departing from the scope of the invention herein disclosed, it is my intention to be limited only by the appended claims.

As my invention I claim:
1. In the method of synthesizing hydroxy-alkoxy-benzophenones, the steps which comprise:
   (a) treating 2,4-dihydroxybenzophenone with a primary alkyl monochloride, wherein the alkyl group contains 8 to 12 carbon atoms, in the presence of a hydrocarbon quaternary ammonium iodide catalyst containing 10–16 carbon atoms per nitrogen atom, and (b) separating and purifying the resulting reaction product to obtain the corresponding 2-hydroxy-4-alkoxybenzophenone, said reaction being carried out in methyl isoamyl ketone or methyl isobutyl ketone medium at temperatures of from 120° C. to 145° C. in the presence of anhydrous potassium carbonate.

2. The method of claim 1 wherein said monochloride is selected from the group consisting of n-dodecyl chloride and octyl chloride.

3. The method of claim 1 wherein the iodide catalyst is selected from the group consisting of tetrabutyl ammonium iodide, triethylbutyl ammonium iodide, triethyloctyl ammonium iodide, and benzyltrimethyl ammonium iodide.

4. In the method of synthesizing hydroxy-alkoxybenzophenones, the steps which comprise:
(a) treating 2,4-dihydroxybenzophenone with a primary alkyl monochloride selected from the group consisting essentially of n-dodecyl and octyl chloride, in the presence of a quaternary ammonium iodide catalyst selected from the group consisting of tetrabutyl ammonium iodide, triethylbutyl ammonium iodide, triethyloctyl ammonium iodide, and benzyltrimethyl ammonium iodide, and
(b) separating and purifying the resulting reaction product to obtain the corresponding 2-hydroxy-4-alkoxybenzophenone.

5. In the method of synthesizing hydroxy-alkoxybenzophenones, the steps which comprise:
(a) treating 2,4 - dihydroxybenzophenone with n-dodecyl chloride in the presence of tetrabutyl ammonium iodide as a catalyst,
(b) separating and purifying the resulting reaction product to obtain the corresponding 2-hydroxy-4-alkoxybenzophenone.

6. In the method of synthesizing hydroxy-alkoxybenzophenones, the steps which comprise;
(a) treating 2,4-dihydroxybenzophenone with octyl chloride in the presence of tetrabutyl ammonium iodide as a catalyst,
(b) separating and purifying the resulting reaction product to obtain the corresponding 2-hydroxy-4-alkoxybenzophenone.

7. In the method of synthesizing hydroxy-alkoxybenzophenones, the steps which comprise:
(a) treating 2,4-dihydroxybenzophenone with octyl chloride in the presence of triethylbutyl ammonium iodide as a catalyst,
(b) separating and purifying the resulting reaction product to obtain the corresponding 2-hydroxy-4-alkoxybenzophenone.

8. In the method of synthesizing hydroxy-alkoxybenzophenones, the steps which comprise:
(a) treating 2,4-dihydroxybenzophenone with octyl chloride in the presence of triethyloctyl ammonium iodide as a catalyst,
(b) separating and purifying the resulting reaction product to obtain the corresponding 2-hydroxy-4-alkoxybenzophenone.

References Cited

UNITED STATES PATENTS

| 2,962,533 | 11/1960 | Hardy et al. | 260—591 |
| 2,976,259 | 3/1961 | Hardy et al. | 260—591 |

FOREIGN PATENTS

| 100,354 | 9/1921 | Switzerland. |
| 100,355 | 9/1921 | Switzerland. |
| 10,095 | 1890 | Great Britain. |

OTHER REFERENCES

Komarowski et al., Ber. Deut. Chem. 27, 1997–2000 (1894).

DANIEL D. HORWITZ, Primary Examiner